March 22, 1955  E. JUNKER  2,704,480
COPYING DEVICE FOR A TURNER'S LATHE FOR THE MACHINING
OF WORK PIECES TO A PREDETERMINED SHAPE
Filed Oct. 3, 1951  4 Sheets-Sheet 1
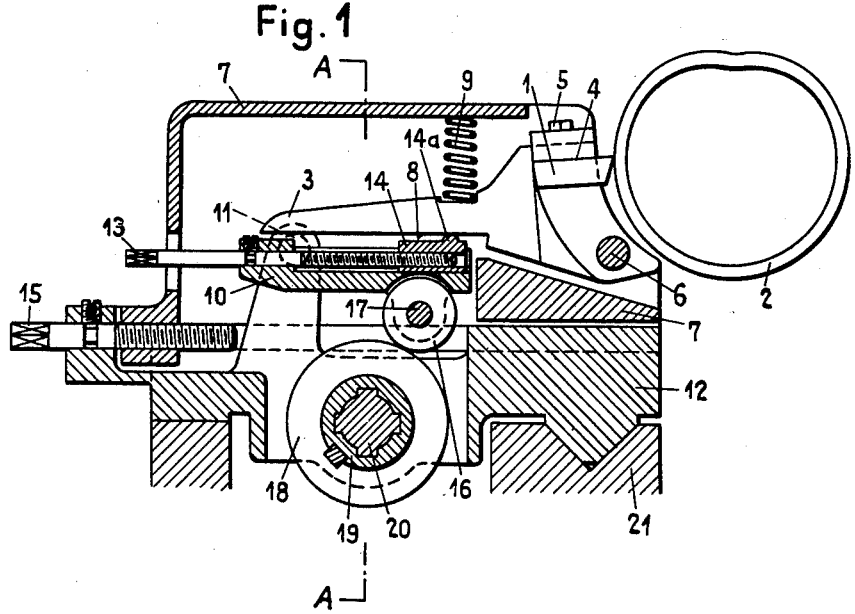
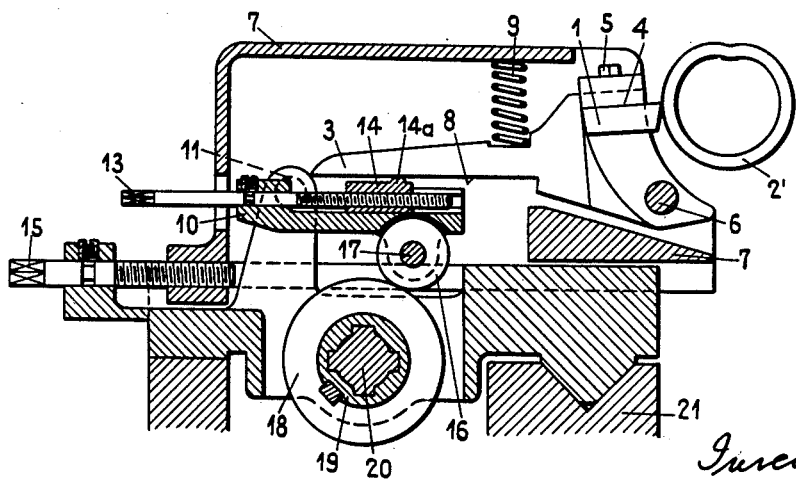

March 22, 1955 E. JUNKER 2,704,480
COPYING DEVICE FOR A TURNER'S LATHE FOR THE MACHINING
OF WORK PIECES TO A PREDETERMINED SHAPE
Filed Oct. 3, 1951 4 Sheets-Sheet 2

Inventor
Emile Junker
By
Singer, Stern & Carlberg
attys

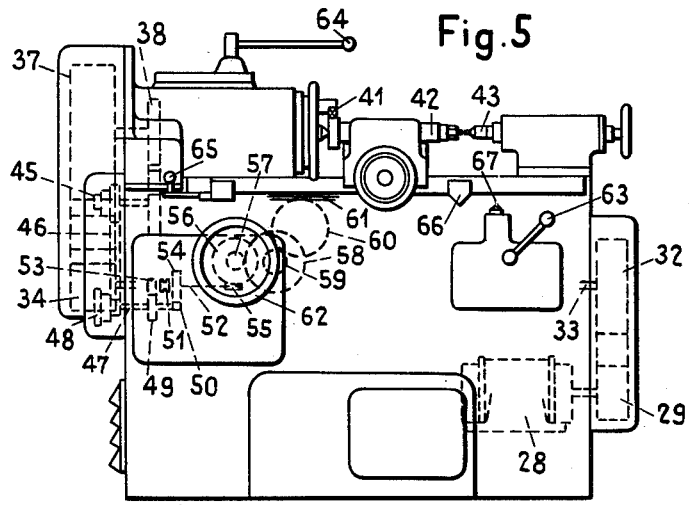
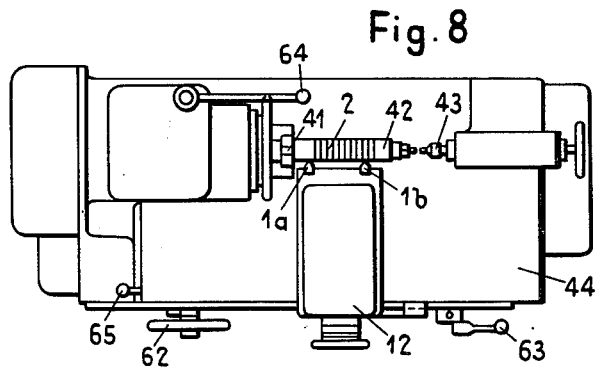

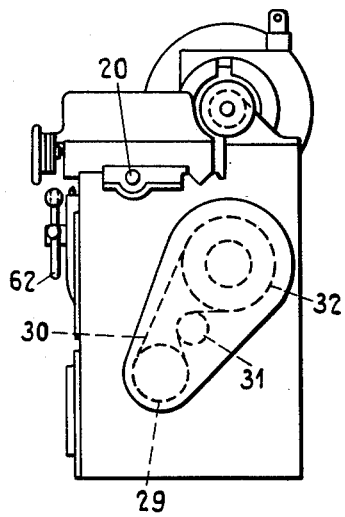
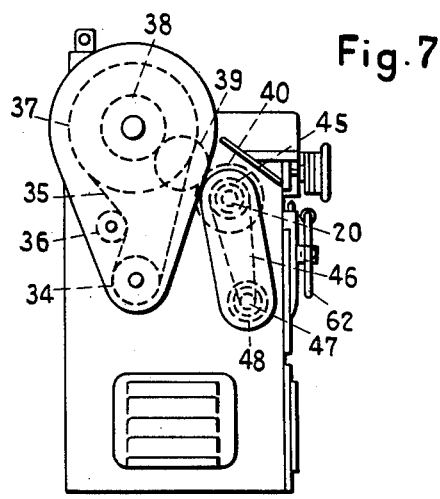

United States Patent Office 2,704,480
Patented Mar. 22, 1955

2,704,480

COPYING DEVICE FOR A TURNER'S LATHE FOR THE MACHINING OF WORK PIECES TO A PREDETERMINED SHAPE

Emile Junker, Zurich, Switzerland

Application October 3, 1951, Serial No. 249,486

2 Claims. (Cl. 82—19)

The invention relates to copying turner's lathe for the machining of work pieces to a predetermined shape.

It is a main object of the invention to provide a copying turner's lathe which is suitable for the machining of work pieces to the high degree of accuracy required e. g. for piston rings.

It is a further object of the invention to provide a copying turner's lathe which allows the turning of similar objects of different size, such as piston rings of different diameter, with the use of a single copying cam.

It is yet another object of the invention to provide a copying turner's lathe which is so constructed that, by varying the rate of feed, always substantially the same amount of cutting work per unit time is performed, independently of the size of the work piece such as piston ring actually being machined.

It is still another object of the invention to provide a copying device which can be fitted on to an existing turner's lathe and which thereby converts the same into a copying turner's lathe according to the invention.

According to a main feature of the invention, a copying device in or for a copying turner's lathe comprises in combination: a bracket fixedly connected to the transverse carriage of the lathe, a tool carrier rocker arm pivoted to this bracket, a copying cam journalled in and an intermediate rocker arm, pivoted on the longitudinal carriage of the lathe, and biassing means positively biassing the said tool carrier rocker arm against the said intermediate rocker arm, and thereby positively biassing the latter against the said copying cam.

Further objects and features of the invention will become clear from the description of some embodiments of the invention which is given in what follows by way of example with reference to the accompanying drawings, in which:

Fig. 1 shows the copying device in a section along the line B—B of Fig. 4 perpendicular to the axis of the headstock when turning a large piston ring to shape.

Fig. 2 shows the copying device in the same section when turning a small piston ring to shape.

Fig. 5 shows the machine tool in elevation from the operator's side.

Fig. 6 shows the machine tool in side elevation as viewed from the right hand side of Fig. 5.

Fig. 7 shows the machine tool in side elevation as viewed from the left hand side of Fig. 6.

Fig. 8 shows the machine tool in top plan view.

Figure 3:
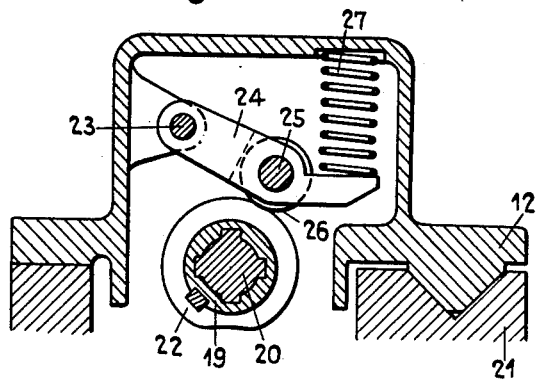
Fig. 3 shows a countercam in a section along the line C—C of Fig. 4 perpendicular to the axis of the headstock.

The two turning tools 1a and 1b (Figs. 1, 2 and 8) which are for rough machining and finishing, respectively, are so arranged, that the tool for rough machining 1a is set back a small amount from the axis of rotation of the turner's lathe. Both turning tools are provided for turning the piston rings 2 which are clamped on to a mandrel and are together arranged on a tiltable tool holder 3 (tool carrier rocker arm) in a slot guide 4 in such a manner that they can be adjusted and fixed by the screw 5. The tool holder 3 which is pivoted without play in the first transverse carriage 7 on a pin 6, is dovetail-shaped, and has on its underside a plane abutment face 8 which in the middle position of the tool holder runs parallel to the direction of movement of the said first transverse carriage 7. By means of a spring 9 the said abutment face 8 is pressed against a second lever, the so called intermediate rocker arm 10, which is pivoted without play on the longitudinal carriage 12 by means of lateral pivot pins 11. This rocker arm 10 carries a spindle 13 by means of which the slide block 14 can be shifted horizontally in a slot guide of the said intermediate rocker arm. This slide block has a nose 14a with which it bears against the abutment face 8 of the tool holder 3.

Shifting of the transverse carriage 7 is effected by means of a spindle 15 journalled in the longitudinal carriage 12 and by such shifting the transmission ratio of the movements of the intermediate rocker arm 10 and of the movements of the tool holder rocker arm 3 is varied. As will be seen, the adjustable nose 14a lies between the axles 6, 11 of the two rocker arms 3, 10.

On the lever 10 the follower roller 16 is journalled by means of the pivot pin 17, which roller is in turn held in constant contact with the copying cam 18 by the spring 9 through the tool carrier arm 3, nose 14a and rocker arm 10. This copying cam 18 is keyed on to the sleeve 19 which in turn is journalled in the longitudinal carriage 12. The sleeve 19 is driven by the splined shaft 20 the bearing of which is arranged in the casing 21.

As shown in Figs. 1 and 2, various sizes of piston rings can be machined by copying them from one and the same cam 18, the procedure being such that the adjustment of the diameter of the piston ring (2 or 2') to be turned to shape is effected by means of the spindle 15 shifting the transverse carriage 7. The shape of the piston ring to be copied from the cam 18 is corrected by shifting the slide block 14 by means of the spindle 13.

Figure 4:
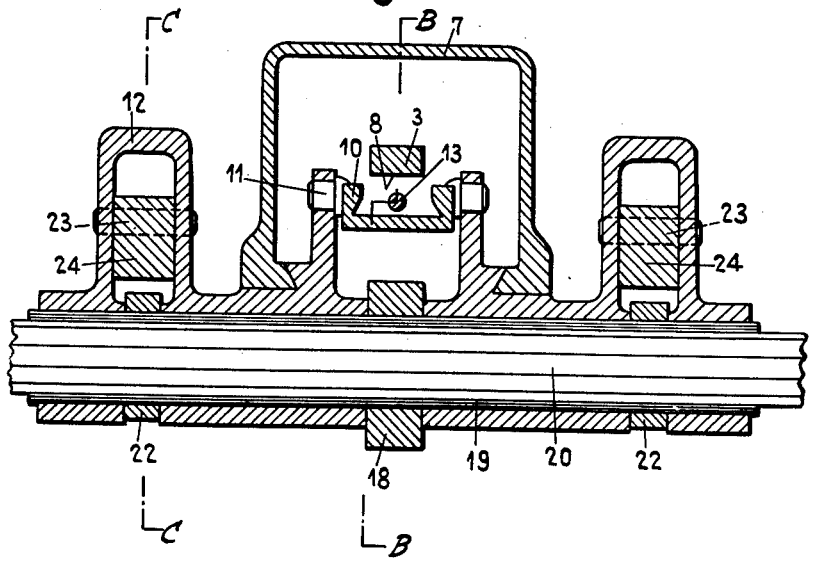
Fig. 4 shows the arrangement of two countercams in relation to the copying cam in a section along the line A—A of Fig. 1.

In order to prevent irregularities in the movement of the turning tool, one or more countercams or compensating cams (in Fig. 4 there are shown two of them) are mounted beside the copying cam 18. The shape of the countercam or cams 22 is the negative image of the copying cam 18, i. e. the radial increments of the copying cam 18 correspond to radial decrements of the countercam or cams, and vice versa.

The copying cam 18 and the countercam or cams 22 are keyed on to the sleeve 19 which is journalled in the longitudinal carriage 12. The said sleeve 19 is driven by the splined shaft 20 which is journalled in the casing 21. The countercam 22 is acted upon by the lever 24 which is pivoted on a pin 23 and which carries the roller 26, which is journalled on the pin 25 and which is pressed against the countercam 22 by the spring 27 which abuts against the longitudinal carriage 12.

Since the throw characteristics of the countercam or cams 22 are exactly complementary to those of the copying cam 18, i. e. the radial increments of the copying cam correspond to the radial decrements of the countercam or cams, and vice versa, and since the force and characteristic of the spring 27 forcing the roller 26 against the countercam 22 have a definite relation to the force and characteristic of the spring 9 which forces the intermediate rocker arm 3 against the copying cam 18, the resultant spring loading of the sleeve 19 remains substantially constant during the rotation of the shaft 20.

The accuracy of the shape copied from the copying cam 18 on to the work piece, such as piston ring 2 or 2', is accordingly unaffected by variations in the position of the sleeve 19 in its bearing which might otherwise occur owing to such variations of loading.

A machine tool associated with the copying mechanism described hereinabove is illustrated in Figs. 5 to 8.

An electric motor 28 having variable speed by pole change and serving as prime mover is arranged on the bed of the turner's lathe. A belt pulley 29 is keyed on to the shaft of the said electric motor 28. The shaft 33 is driven by means of the belt 30, belt pulley 32 and jockey roller 31. On to the other end of said shaft 33 a belt pulley 34 is keyed, whereby the belt pulley 37, which is keyed on to the lathe spindle is driven from this belt pulley 34 through the flat belt 35, and via a jockey roller 36. By the gear wheel 38 keyed on the lathe spindle, and the intermediate gear wheel 39, the gear wheel 40 keyed on to the splined shaft 20 is driven, which shaft drives in turn the sleeve 19 of the copying cam 18. On the lathe spindle, means 41 are provided to ensure that the mandrel 42 and the piston rings 2 which are compressed into a packet, can be clamped on to the lathe spindle in one position only. The mandrel 42 is held in an opposite point journalled in the tail stock 43.

The drive of the feed of table 44 which is the carrier of the copying mechanism (casing 12) described hereinabove, is effected through a stepped pulley 45 keyed on to the splined shaft 20, a flat belt 46 and a second stepped pulley 48 keyed on to an intermediate shaft 47. Two gear wheels 49 and 50 are keyed on to the latter. According to the position of the dog clutch sleeve 51 the shaft 52 is driven through a gear wheel 53 or a gear wheel 54. The toothed rack 61 which is fixedly connected to the table 44 is driven through a worm 55, worm wheel 56, pinion 57, gear wheel 58, pinion 59 and gear wheel 60.

The operation of this special turner's lathe is as follows: with the lathe spindle declutched, the table 44, and the copying mechanism mounted on it, is placed by means of the hand wheel 62, the gear wheels 57, 58, 59, 60 and the toothed rack 61 to the extreme right hand side position. The mandrel 42 is exchanged for a fresh one in the usual manner, and the lever 63 is brought into the rough turning position. Since the electric motor 28 is provided for change of poles, the same can be set now by means of the lever 63 to a slow speed of revolution. By means of the clutch lever 64 the jockey roller 36 is pressed against the belt 35, whereby the lathe spindle is coupled to the electric motor 28. By means of the lever 65 the feed of the table 44 is engaged. The lever 63 is connected to the double dog clutch sleeve 51 so that by setting the same to the rough turning position the large feed is adjusted at the same time.

When the roughing tool 1a has roughturned the packet of piston rings 2, the abutment 66 arranged on the table 44 presses the opposite abutment 67 down, whereby the lever 63 is pushed into another position, which has the consequence that in the electric motor 28 a pole change to high speed of revolution is effected. At the same time the sleeve 51 of the double dog clutch is shifted horizontally whereby the feed is reduced, so that the piston rings 2 are finished at increased speed of revolution of the lathe spindle and at a reduced feed.

When this operation is finished, the clutch lever 65 is put into the idle position of the feed by means of the stop 68 arranged on the table 44, so that the table 44 comes to a standstill. By operating the lever 64 the lathe spindle is disengaged from the drive, so that the mandrel 42 can be exchanged again.

While I have described hereinabove what may be considered as particularly useful embodiment of my invention, I wish it to be understood that I do not limit myself to the accurate details of construction or to the dimensions of the embodiment shown and described, for obvious modifications will occur to a person skilled in the art depending on the special circumstances and conditions in which my invention may be used.

What I claim as my invention and desire to secure by Letters Patent, is:

1. In a copying lathe for machining non-round work pieces such as piston rings, a copying cam, a first rocker arm, tools secured to said first rocker arm, a second rocker arm, a roller pivotally mounted in said second rocker arm for engagement with said copying cam, spring means urging said first rocker arm against said second rocker arm to maintain said roller in engagement with said copying cam, a sleeve carrying said copying cam in fixed relation thereto, two countercams fixedly mounted on said sleeve in symmetrical relation to said copying cam, the contour of said countercams being the negative image of said copying cam, and auxiliary springs acting on said countercams to compensate the decrease and increase in pressure from said spring means on said sleeve.

2. In a copying lathe for machining non-round work pieces, a copying cam, rotatable means supporting said copying cam, countercams fixedly mounted on said supporting means in substantially symmetrical relation to said copying cam, the contour of said countercams being the negative image of said copying cam, a first rocker arm for support of tools, a second rocker arm, a roller rotatably mounted in said second rocker arm for engagement with said copying cam, first spring means urging said first rocker arm against said second rocker arm to maintain said roller in engagement with said copying cam, and second spring means acting on said countercams in substantially the same direction as said first spring means so that, when said first spring means is compressed by the copying cam through the intermediary of said rocker arms, said second spring means are correspondingly expanded, and vice versa, whereby the combined spring pressure on said supporting means remains substantially constant during the rotation of said cams.

References Cited in the file of this patent

UNITED STATES PATENTS

| | | |
|---|---|---|
| 539,212 | Amet | May 14, 1895 |
| 1,259,770 | Olson | Mar. 19, 1918 |
| 1,739,268 | Stein | Dec. 10, 1929 |
| 1,893,916 | Waldrich | Jan. 10, 1933 |

FOREIGN PATENTS

| | | |
|---|---|---|
| 632,902 | Germany | July 16, 1936 |